(12) United States Patent  
Chai et al.

(10) Patent No.: US 11,995,682 B2
(45) Date of Patent: *May 28, 2024

(54) PUSHING CONTENT TO SECONDARY CONNECTED DEVICES

(71) Applicant: OpenTV, Inc., San Francisco, CA (US)

(72) Inventors: Crx Chai, Oakland, CA (US); Isaac Chellin, San Francisco, CA (US); Alex Fishman, San Francisco, CA (US); Pierre Sarda, Echallens (CH)

(73) Assignee: OPENTV, INC., San Francisco, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 17/398,792

(22) Filed: Aug. 10, 2021

(65) Prior Publication Data
US 2022/0067781 A1 Mar. 3, 2022

Related U.S. Application Data

(63) Continuation of application No. 16/654,325, filed on Oct. 16, 2019, now Pat. No. 11,120,470, which is a
(Continued)

(51) Int. Cl.
G06Q 30/02 (2023.01)
G06Q 30/0242 (2023.01)
G06Q 30/0251 (2023.01)

(52) U.S. Cl.
CPC ..... G06Q 30/0251 (2013.01); G06Q 30/0242 (2013.01)

(58) Field of Classification Search
CPC .......... G06Q 30/0251; G06Q 30/0242; G06Q 30/02; G06Q 30/0269; G06F 17/30828; G06F 17/30253; G06F 17/30787; G06F 17/3084; H04L 67/148; H04L 67/306; H04N 21/812; H04N 21/41407; H04N 21/43615; H04N 21/44222
(Continued)

(56) References Cited

U.S. PATENT DOCUMENTS 7,853,124 B2 * 12/2010 Ramaswamy ......... H04N 21/44
 386/239
11,120,470 B2 * 9/2021 Chai .................. G06Q 30/0251
(Continued)

OTHER PUBLICATIONS

Integrating_personal_media_and_Digital_TV_with_QoS_guarantees_using_virtualized_set-top_boxes_Architecture_and_performanc e_measurements (Year: 2010).*
(Continued)

Primary Examiner — Gautam Ubale
(74) Attorney, Agent, or Firm — POLSINELLI LLP

(57) ABSTRACT

Systems and methods of pushing content to secondary connected devices include pushing targeted content such as interactive advertisements, banners, games or application to secondary connected devices in a household. The targeted content may reflect user preferences associated with the secondary connected devices, including user behaviour and previous interaction with various forms of content viewed on the secondary connected devices. The targeted content may be either locally cached or retrieved from an advertisement server at the time of pushing to the secondary connected devices.

20 Claims, 18 Drawing Sheets

Related U.S. Application Data continuation of application No. 13/756,397, filed on Jan. 31, 2013, now abandoned.

(60) Provisional application No. 61/697,989, filed on Sep. 7, 2012.

(58) Field of Classification Search
USPC .......................................................... 705/1
See application file for complete search history.

(56) References Cited

U.S. PATENT DOCUMENTS

| | | | | |
|---|---|---|---|---|
| 2005/0149968 A1* | 7/2005 | Konig | .............. | H04N 21/25891 348/E7.06 |
| 2007/0219859 A1* | 9/2007 | Huntington | ........ | G06Q 30/0246 705/14.66 |
| 2009/0299843 A1* | 12/2009 | Shkedi | .................... | H04N 21/47 705/14.39 |
| 2010/0269128 A1* | 10/2010 | Gordon | .............. | H04N 21/2668 725/25 |
| 2011/0137976 A1* | 6/2011 | Poniatowski | ...... | H04N 21/4334 707/769 |
| 2012/0096489 A1* | 4/2012 | Shkedi | ............... | G06Q 30/0269 725/32 |
| 2013/0036011 A1* | 2/2013 | Roberts | .............. | H04N 21/4223 705/14.58 |
| 2013/0036434 A1* | 2/2013 | Shkedi | ............... | H04N 21/4532 725/14 |
| 2013/0326554 A1* | 12/2013 | Shkedi | ................. | H04N 21/812 725/34 |
| 2014/0282662 A1* | 9/2014 | Major | .............. | H04N 21/44016 725/18 |
| 2016/0150297 A1* | 5/2016 | Petrovic | ........... | H04N 21/23892 725/25 |
| 2018/0063572 A1* | 3/2018 | Smus | .................... | G10L 19/018 |

OTHER PUBLICATIONS

Enabling_Pro-Active_User-Centered_Recommender_Systems_An_Initial_Evaluation (Year: 2007).*
Connected_TV_and_beyond (Year: 2012).*
Media_Share_-_An_IPTV_Service_Development_Deployment_and_Delivery_Platform (Year: 2010).*
Bringing_Content_Awareness_to_Web-Based_IDTV_Advertising (Year: 2012).*
A Method of using RFID to identify suitable adverts in a set top box (Year: 2011).*

* cited by examiner

PUSHING CONTENT TO SECONDARY CONNECTED DEVICES

CROSS-REFERENCES TO RELATED APPLICATIONS

This application is a continuation of U.S. patent application Ser. No. 16/654,325 filed Oct. 16, 2019, which is a continuation of U.S. patent application Ser. No. 13/756,397 filed Jan. 31, 2013, which claims priority to U.S. Provisional Patent Application No. 61/697,989, filed Sep. 7, 2012, the entire contents of each which are incorporated herein by reference in their entirety for all purposes.

TECHNICAL FIELD

The present document relates to the fields of interactive television and digital advertisements.

BACKGROUND

With advances in electrical and computer technologies, the number of display screens on which a user can view audio/video programming is ever increasing. In some content delivery systems for television services, a service provider (e.g., a cable, satellite or fiber optic network operator) delivers content to a receiver device located in user premises, e.g., a set-top box. The receiver device decodes user selected content in communication with the receiver device and displays the decoded content on a television screen. In recent years, various communication devices or companion devices are becoming secondary devices that enable users to receive content from the service provider. Examples of such devices include tablet computers, smartphones, laptop computers, secondary televisions and others. The content provided by the service provider can include advertisements, which are a source of revenue for content providers or service providers.

SUMMARY

Techniques are disclosed for providing targeted advertisements to users of secondary connected devices from a primary user device. The targeting may be based on a user profile associated with the secondary connected device. The targeting may be based on identification of the content being received over a content network and being viewed by the user.

In one aspect, methods, apparatus and computer program products for facilitating advertisement content to a user operating a secondary user device by receiving over a content network interface, primary content at a primary user device, performing content recognition on the received primary to determine an attribute of the received primary content, receiving a playback indication from the secondary user device, selectively modifying, based on the playback indication and the attribute, the primary content with a secondary advertisement, and providing, the selectively modified primary content to the secondary user device for displaying to the user.

In another aspect, methods, apparatus and computer program products for facilitating advertisement content to a user operating a secondary user device by receiving live content transmission comprising an advertisement, receiving an ad bundle comprising a plurality of targeted advertisements, identifying the advertisement included in the live content transmission, modifying the advertisement to include one of the plurality of targeted advertisements based on the identification of the advertisement and a user profile associated with the user device, and transmitting the modified advertisement to the user device.

These and other aspects and their implementations are described in greater detail in the drawings, the description and the claims.

BRIEF DESCRIPTION OF DRAWINGS

Embodiments described herein are illustrated by way of example and not limitation in the figures of the accompanying drawings, in which like reference numbers indicate similar elements and in which.

DETAILED DESCRIPTION

Figure 1:
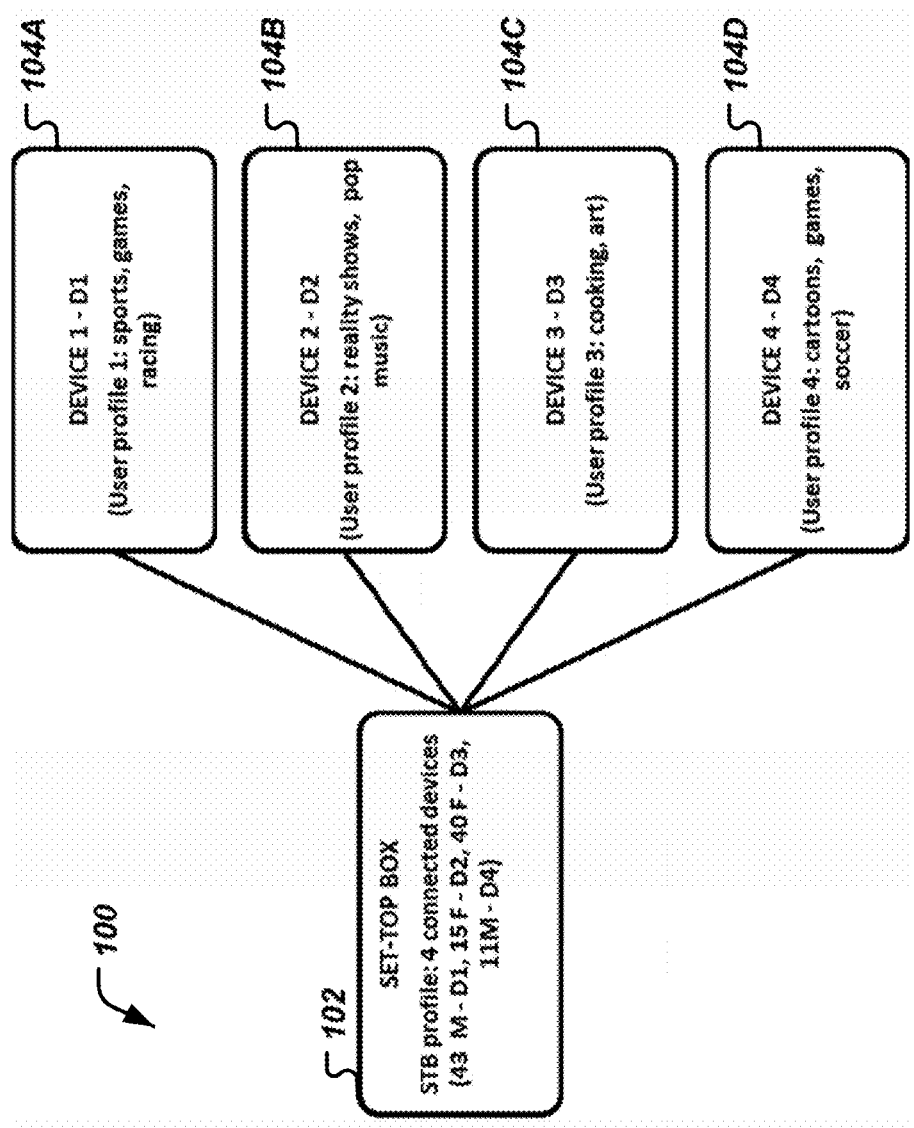
FIG. 1 is a block diagram illustrating the levels of user profiles.

The technology described in this document can be implemented in content delivery to television viewers to enhance options or features for content providers, service providers and/or the television viewers, including providing advanced advertising and user experience. For example, certain content delivery modules or functionalities can be implemented in the television delivery system and software tools to push certain content (e.g. interactive advertisements, banners, games, or applications) to secondary connected devices within a household. The technology described in this document can also be used to collect information about which content, e.g., primary or secondary advertisement content, was played on which primary or secondary device and the corresponding user profile associated with the device. This information may in turn be used to verify the success of an advertisement campaign.

A television delivery system can be designed to enable one or more televisions at the customer site (e.g., a subscriber household) to receive from such a system advertising content from a broadcast provider. A machine separated from the one or more televisions, such as a secondary connected device, can be configured to receive television contents including the advertising content and to recognize the advertising content. Accordingly, advertising content may be transmitted to one or more secondary connected devices at the customer site. Secondary connected devices may include tablet computers, smartphones, laptop computers, and various portable communication devices.

Specific implementations of techniques are provided here for pushing content to secondary connected devices. The secondary connected devices are also referred to as secondary user devices. In some circumstances, secondary devices may not have a direct network connection with a content network and may receive content from a primary user device at the customer premise or site for the subscriber television service, e.g., a cable set-top box, a satellite set-top box, an over-the-top OTT receiver, etc. Some embodiments extend to a machine-readable medium embodying instructions which, when executed by a machine, cause the machine to perform any one or more of the methodologies described herein. Various features will be apparent from the accompanying drawings and from the detailed description that follows. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Advertising today may be targeted to geographic locations based on a zip code model. In this model viewers residing in a certain zip code or "zip code+5" are considered to have similar socio-economic backgrounds and thus similar interests. Content that is pushed to set-top boxes in the same zip-code group is targeted for audiences with similar socio-economic backgrounds. Thus the assumption made by broadcast providers is that viewers who reside within the same zip code have similar interests in advertising. However, this may not always hold true. Each household within a zip-code group may have multiple persons living within the household. Each person or viewer may have a different interest. Broadcast providers may fail to properly capture the full range of audience potential by targeting advertisements to viewers solely based on using the zip-code model.

Using World Wide Web technologies such as cookies, advertisers often collect information about user interaction with advertisements and profiles of users who received the advertisements (e.g., other web sites visited by the user). Advertisers are often interested in knowing the effectiveness of an advertisement campaign—e.g., how many users watched the advertisement and additional profile and demographic data associated with the users (gender, age group, income level, professional status, etc.). However, reliable collection of such data through the above-mentioned web technologies can often be unreliable for various reasons such as the use of virtual private network (VPN) which often obfuscates a user's real geographic region, shared use of computers, browsers that do not allow cookies to be stored, lack of business arrangement to share cookies among different web site operators, and so on.

The technologies described in this document can be implemented to overcome the above-discussed shortcomings on the Internet based advertising, and others. Typical broadcast content delivery networks provide a more reliable indicator of a user's location. Furthermore, as discussed in greater detail below, the disclosed targeted advertisement techniques can be used to provide information useful to ascertain effectiveness of an advertisement campaign.

In one exemplary implementation of content delivery, each set-top box in a household may record the number of secondary devices connected to the set-top box. When each set-top box within a household is configured, a set-top box profile is created for the set-top box. The set-top box profile for example may contain information regarding the number of secondary connected devices, the parental locking preferences of the user, and the zip-code location of the set-top box. A user may input whether there are any secondary devices that may connect to the data in the box. Each set-top box may record how many different users are affiliated with each secondary connected device. The set-top box will record user data (e.g. age, gender, amount of secondary device usage) regarding the type of user associated with each secondary connected device. This generalized device profile is stored at the set-top box and allows the set-top box to send targeted content to each secondary connected device based on the generalized device profile.

In some implementations, a user profile is created for each unique user and this profile is associated with the user's secondary connected device. A user profile contains information regarding a user's behaviour and interaction with various forms of content viewed on the secondary connected device (e.g. broadcast content, streaming content, or other interactive content). As a user interacts with his or her secondary connected device a profile is created for the user. This profile determines an individual user's preferences such as likes and dislikes at the secondary connected device level.

FIG. 1 is a block diagram 100 illustrating that a combination of various types of data collected at each profile level may be used to deliver targeted content with a unique experience for each member of a single household. The first profile level is the set-top box profile 102. The set-top box profile level 102 may maintain data which indicates the number of secondary connected devices (e.g. two tablets, four mobile devices) and the generalized profile of each device user (e.g. age and gender). The second level is the user profile, e.g., 104A, 104B, 104C and 104D. This user profile level may maintain data of individual user (e.g. usage, preferences, and user behaviour). The user's interactions and access of content using the secondary connected device is used to create a detailed profile of the user. The user profile may then be used to define the unique interests of each user.

In one embodiment the broadcast provider delivers a single content package to each set-top box within a geographic region. All set-top boxes within zip-code 12345 will receive the same content package. A content package may be a bundle of interactive applications and banners for a given advertisement. The various interactive applications and banners are created by the advertising provider as a part of a single content package. Each interactive application or banner in the single content package is uniquely catered for a different user. Although a single content package may be delivered to each set-top box, each secondary connected device will receive a different interactive application or banner based on the profile of the secondary connected device. For example, if zip code 12345 normally is positioned to receive fast-food commercials for a fast-food restaurant such as McDonalds, all set-top boxes within the zip-code will receive a single content package of McDonalds advertising according to the zip-code model. The single content package contains the national McDonalds advertisement that will be played on the primary connected device. Based on the user profiles associated with each secondary connected device a different interactive application or banner will be pushed to the secondary connected device. If the set-top box has four connected devices where one indicates the user is a vegetarian, one indicates the user is a child, one indicates the user likes fruit, and one indicates the user likes meat each secondary connected device associated with each user will receive the application that best matches their preferences. For example, a user who is vegetarian may receive a banner with a coupon for the new McDonalds salad; a user who is a child may receive an interactive application showing the newest child's meal toys; and a user who is a meat lover may receive a banner for the biggest burger whereas a fruit enthusiast user may receive the latest promotional offer for a fruit beverage.

In another embodiment advertisement providers and broadcast providers may provide billing at two levels, one for each advertisement delivered to the primary connected device and a second level for each targeted advertisement directly delivered to a secondary connected device. In a further example of the present embodiment, the level of interaction between the user and the interactive application or banner may also provide for a more in depth billing system. For example, if the user closes the banner as soon as it is pushed onto the secondary connected device the billing rate would be lower than a user who interacts and explores further with the pushed content.

The technology described in the present document may also use automatic content recognition (ACR) technology that recognizes specific content or advertising to verify when an actual advertisement has been played. When a commercial begins to play, and is recognized by the ACR system, a signal is sent back to the server indicating such. The server then checks to verify whether the commercial also has the targeted advertisement content package. When such a package is found, the server sends the set-top-box the single content package of targeted advertisements. The single content package of targeted advertisements contains all the targeted content that may be related to the advertisement. This content is provided to the broadcast provider from the advertising company. The package may include the targeted interactive applications or banners that may be pushed out to each unique secondary connected device. Therefore, ACR technology in this example enables automatic additional advertising or other content delivery to a viewer that is associated with the primary content of a program that is viewed by a viewer.

Figure 2:
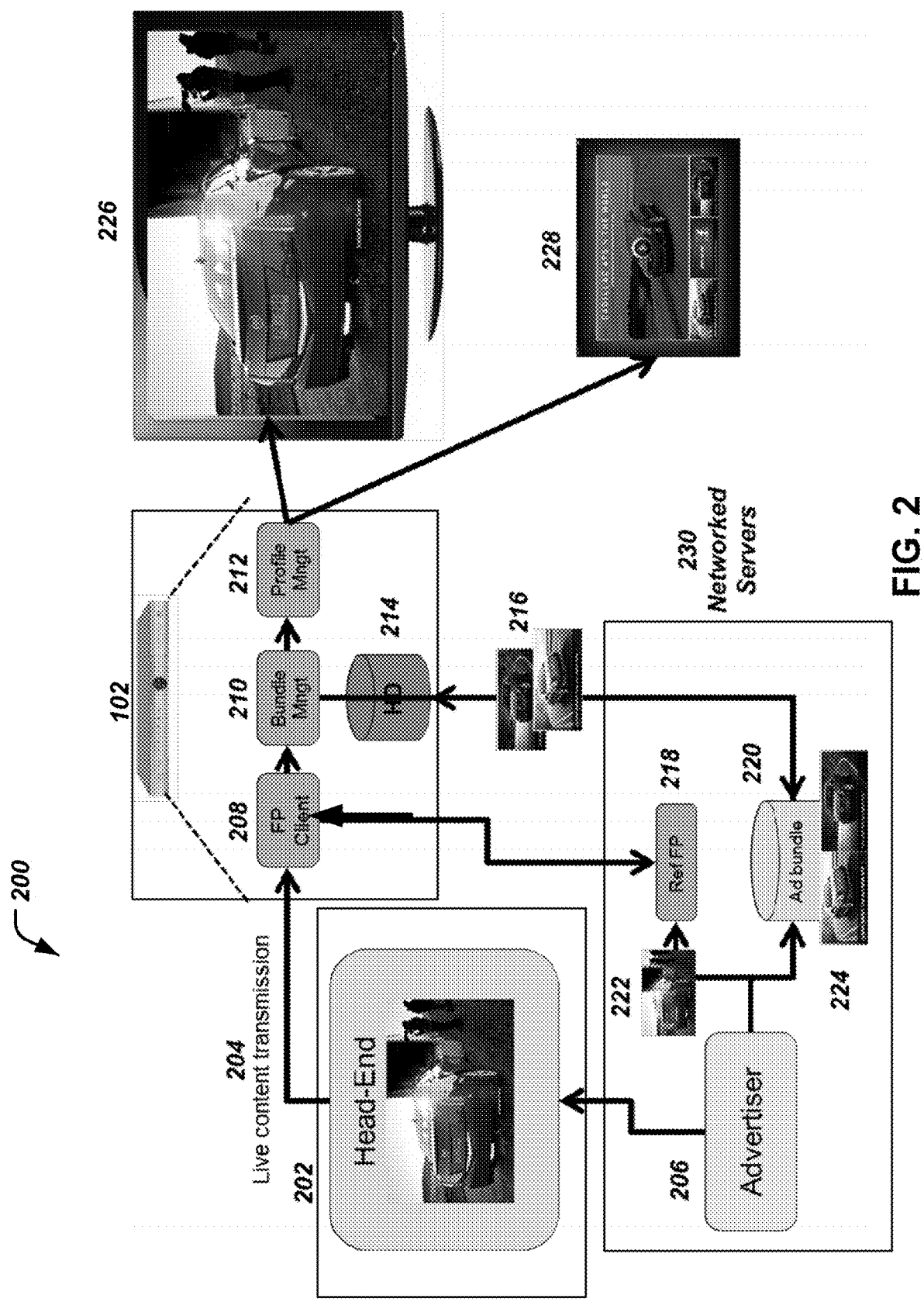
FIG. 2 is a diagrammatic representation illustrating content package references stored in a head end database.

FIG. 2 is a diagrammatic representation of automatic content recognition (ACR) technology used in an exemplary system 200 to recognize specific content or advertising for which there exists a pre-prepared content package or bundle which has been sent to the set-top-box.

The system 200 includes a head-end 202 that provides live content transmission 204 to a set-top box (e.g., a primary user device) 102. An advertiser server 206 provides advertisements to carry with the live content transmission 204. The set-top box 102 includes a fingerprint client function (FP client 208) that detects the incoming advertisement and queries a reference Fingerprinting (RefFP) database server 218. The RefFP 218 may be populated by the advertiser server 206 with primary content and an ad bundle 224 comprising one or more secondary advertisements, stored in an ad bundle server 220.

During operation, a bundle management function 210 in the set-top box 102, with optionally a buffer (e.g., a hard drive 214) receives the secondary advertisement content over a second network connection (e.g., a data connection such as a DOCSIS connection for a cable set-top box). A profile management function 212 can display the primary content (226) or could adjust the ad content being displayed on a companion device 228. In some cases, the primary content may itself be an advertisement.

In the example in FIG. 2, in one implementation, when the single content package is at the set-top box 102, the ACR system only requires an internal lookup table filled with the specific sequences of information necessary to recognize the content. As such, each time the sequence (e.g. advertisement) is recognized, the set-top box 102 will use the single content package to add the appropriate banners or advertisements to the secondary connected devices. This method may avoid requiring a dedicated connection to an external server.

The system 200 in FIG. 2 includes networked servers 230 in communication with the headend 202 and the set-top box 102. An advertiser 206 represents one or more computer servers that provide advertisement information to the headend 202 and also maintain a reference fingerprint lookup (RefFP) 218 that matches content (e.g., 222) and the ad bundle 224 at an advertiser's server. In operation, the FP client module 208 of the set-top box 102 may communicate with the RefFP module 218 to communicate content recognition information, which then results in the set-top box 102 receiving an appropriate targeted advertisement 216 for temporary storage at the hard drive 214. This communication may occur on a second network interface that is different from the network interface on which live content transmission 204 is received.

The set-top box profile indicates whether or not there are any secondary connected devices once the set-top box receives the single content package or bundle. If there are no secondary connected devices associated with the set-top box the single content package only plays the main national advertisement on the primary display screen. In a further example, if there are existing secondary connected devices the set-top box profile indicates which device belongs to which specific demographic. Based on this information the single content package is segmented and each interactive banner or application is pre-assigned by the advertising provider to target a specific demographic. If the specific demographic of the secondary connected device matches the demographic range for a certain segment of the single content package, then the secondary connected device may receive that specific interactive application or banner.

In another embodiment, advertisements may be scheduled to play at various times using various scheduling mechanisms and techniques. Just because an advertising provider wants to play an advertisement at a certain time slot does not necessarily mean that the advertisement will play in that time slot due to various scheduling conflicts. Therefore, there must be some other means to verify that an advertisement has been played in order to trigger the receipt of the single content package and the segmentation and pushing of the interactive applications and banners associated with the advertisement. Automatic content recognition (ACR) technology allows for the verification of advertisement play out. Once an advertisement actually begins to play, ACR may be used to determine which advertisement is playing and whether that advertising campaign contains a single content package which may have targeted content to distribute to secondary connected devices.

Consider, for example, a district with a zip code 12345 has a certain socio-economic standing where the average income of all households is $100,000. Assume that this is the socio-economic range that an automobile manufacturer (e.g., Honda) wants to target. When the Honda national advertisement is played in House A in 12345 zip code an ACR of the advertisement triggers the server to indicate that the Honda advertisement has been played. The set-top box then checks to see if there is a single content package for the advertisement. If the advertising campaign comes with more targeted content and the set-top box profile indicates there are secondary connected devices then each connected device will receive a different interactive application or banner based on the user profile of the secondary connected device. For example in House A, the dad may receive an interactive advertisement for a Honda truck model in his favorite color on his tablet computer (e.g., iPad), the mom may receive a Honda mini-van model on her tablet, the kids might receive the new features that can be included in the latest Honda cars, such as drop-down TVs for playing video games on their mobile phones. Thus each person within a single household will receive a unique advertisement based on the user profile. The targeted content for different users in the household will be pushed to their respective connected devices without interrupting the primary content display screen.

Figure 3:
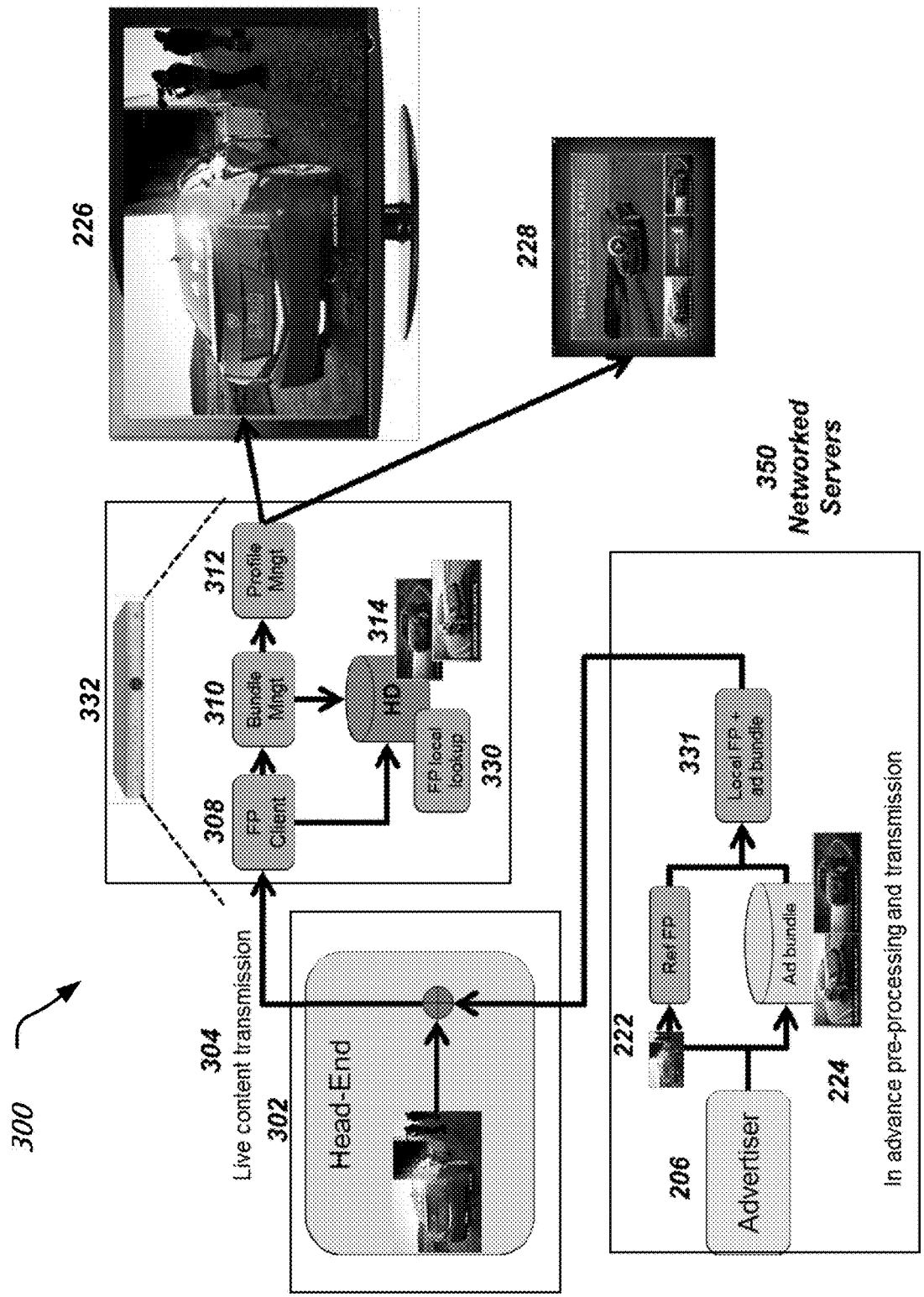
FIG. 3 is a diagrammatic representation illustrating a pre-processed look-up table.

FIG. 3 is a diagrammatic representation of automatic content recognition (ACR) technology used to recognize specific content or advertising for which there exists a pre-processed look-up table for the ACR system. In this embodiment the sequences may be well known and may be recognized in advance. A dedicated lookup table for the ACR system may be pre-processed and sent to the set-top box as a specific single content package. This embodiment may require only one connection to a central server in order to receive or update the data. The ACR system may only need to check locally if the predefined sequence is playing.

The system 300 depicted in FIG. 3 includes a head-end 302 that provides live content transmission 304 to the set-top box 332. The set-top box 332 includes a Fingerprint client module 308, a bundle management module 310 and a profile management module 312. The set-top box 332 may include a storage device such as a hard drive 314 and further may store a local fingerprint lookup table 330.

One or more networked servers 350 can be provided to include an advertiser server 206 to generate reference fingerprint set 222 and an ad bundle 224, as previously described, and transmit the reference fingerprint lookup information along with the ad bundle 331 to the headend 302. The headend 302 may provide this information to the set-top box 332 by transmitting in-band or out-of-band with the live content transmission 304.

Comparing the system 200 depicted in FIG. 2 and the system 300 depicted in FIG. 3, it can be seen that in system 200, the set-top box 102 receives live content transmission on a first network interface and receives targeted advertisements on a second network interface. Furthermore, minimal local storage may be needed to temporarily store targeted advertisements 216 at the local storage hard drive 214, before the targeted advertisements are transferred to a secondary user device 228. In system 300, the set-top box 332 may receive both the live content transmission and the targeted advertisements on the same network interface. In addition, the set-top box 332 may also receive FP lookup information over the live transmission interface and locally store this information along with the targeted advertisements. Therefore, set-top box 332 may, e.g., have a single network interface but may need additional storage space to store multiple target advertisements for targeted transmissions to secondary client devices 228.

In a further embodiment each secondary connected device receives the interactive application or banner in a unique graphical user interface based on the user's profile. In an example of the present embodiment, two kids in a household may receive the same interactive application. However one child may have indicated that purple is his favourite color. The other child has indicated that red is his favourite color. Both children may receive the same interactive application, but when it appears on their respective secondary connected device the application may be presented in a manner which reflects their unique preferences. Additionally, children may have more animated user interfaces where as some adults may have more simple interfaces with large letters or symbols.

The user profile is used to create a unique graphical user interface for each secondary connected device. A user's preferences are taken into consideration when delivering the targeted content to each secondary connected device such that the manner in which the content is displayed is unique for each secondary connected device. In an example embodiment, one user is an eight year old girl and her preferences are for princess themed content, pink, and dolls. Her GUI may present the targeted content in a pink banner with princesses surrounding the content. The same content may be delivered to another user, an eight year old boy who prefers cars, red and superheroes. When the boy will receive the content it may be displayed inside a red banner with a car as a cursor instead of an arrow or hand. The manner in which the targeted content is displayed for each user is unique and based on the preferences indicated in the user profile. The types of combinations and alterations that may be made for each user interface is not limited by the aforementioned examples, these are merely example embodiments and not limitations of the present document.

In another embodiment all data at the interactive level is mined and returned back to the broadcast provider. Any interaction or involvement by the user with the interactive advertisement or banner is reported back to the broadcast provider as data to improve future advertising campaigns. The actions taken by the users are collected and returned to the server. This data shows whether or not the banner was closed or opened, and any actions (e.g. clicking, dragging, opening, closing, downloads, increasing or decreasing volume, amount of time before content was closed) that were taken or not taken by the user with regards to the specific banner.

In some embodiments, the data returned to the broadcast provider is processed and shared with an advertiser. For example, an advertiser may be interested in knowing how many teenagers watched a particular ad from the ad bundle. The broadcast provider may use the information about user interaction with the targeted secondary advertisements, along with user profile data for the secondary device, to compile such information in the network.

In some embodiments, a module is provided on the secondary user device for the user to be able to look up the user history of targeted advertisement received and optionally a profile label associated with the user. For example, in some implementations, a user may be able to press a menu option, either on the user remote control or an on-screen menu widget, to retrieve a list of targeted advertisements received such as the last ten advertisements. Optionally, additional label data may be provided. For example, an ad received with label "M3SpP" may identify that the particular targeted advertisement was based on gender (M=male), age (3=thirty-plus) and interests (Sp=likes sports programming, P=pet owner). Such information, when processed (e.g., to remove any information identifying a specific user) and made available to an advertiser may give the advertiser an idea of the acceptance rate for a particular targeted ad by age, gender, interests, etc. In some implementations, an ACR module on the secondary user device may identify the advertisement content being played on the secondary user device and provide a feedback to the primary user device about the advertisement that was played out to the user, as recognized by the ACR component.

Figure 4:
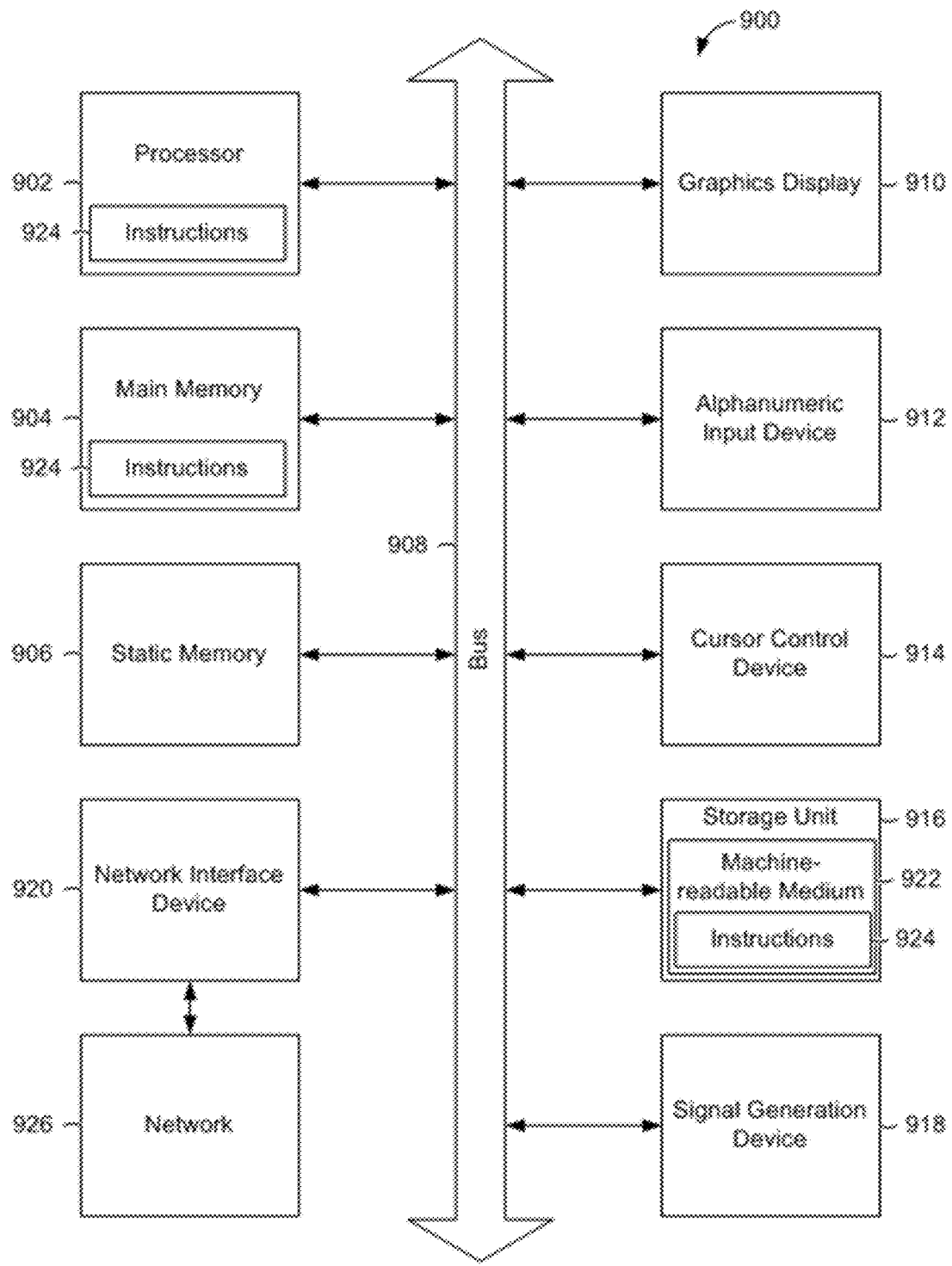
FIG. 4 is a block diagram illustrating components of a machine, according to some example embodiments, able to read instructions from a machine-readable medium and perform any one or more of the methodologies discussed herein.

FIG. 4 is a block diagram illustrating components of a machine 900, according to some example embodiments, able to read instructions from a machine-readable medium (e.g., a machine-readable storage medium) and perform any one or more of the methodologies discussed herein. Specifically, FIG. 4 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (SET-TOP BOX), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 190) via the network interface device 920.

Figure 5:
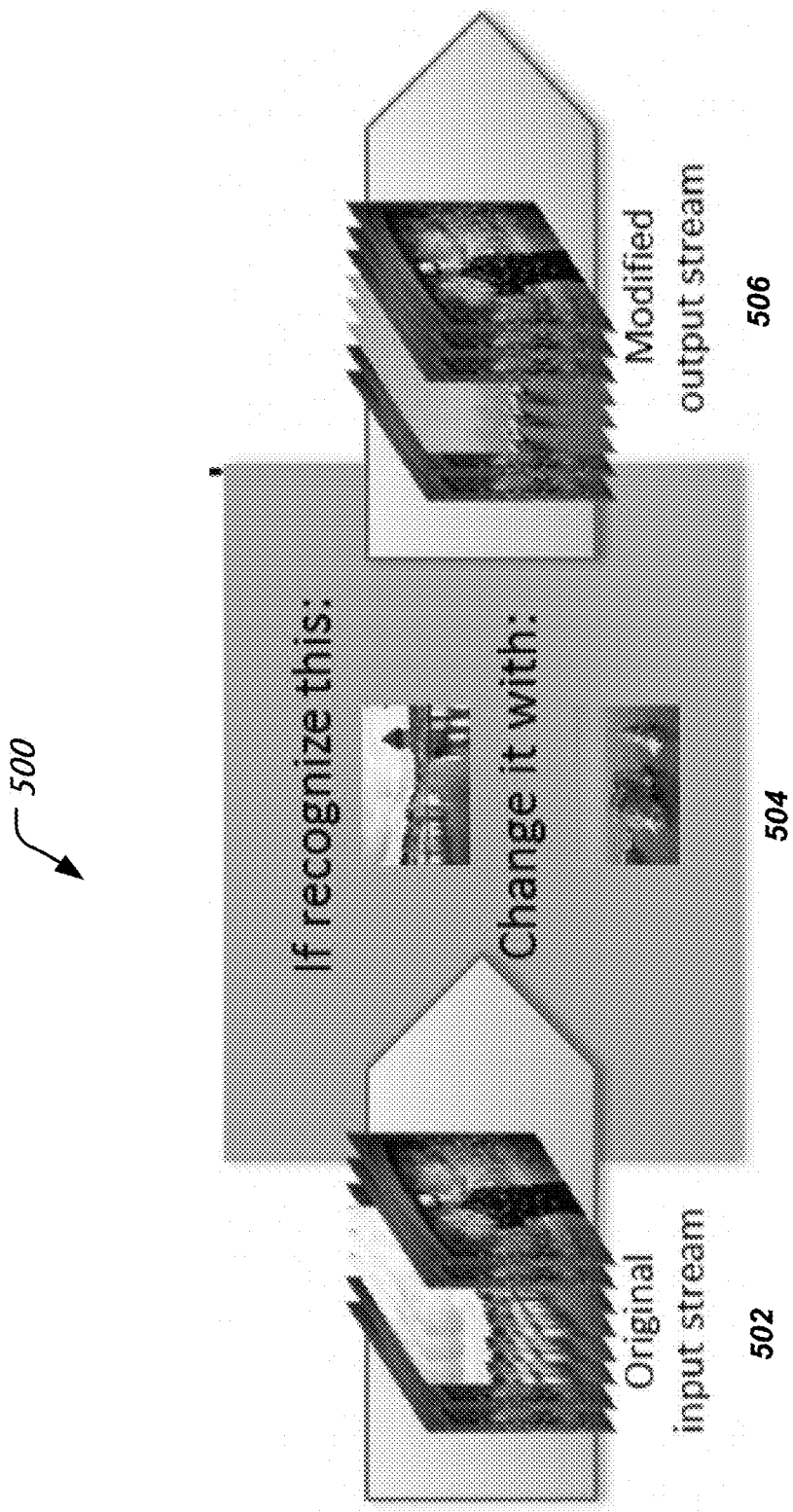
FIG. 5 is a block diagram representation of an automatic content recognition technique.

FIG. 5 is a block diagram representation of an automatic content recognition (ACR) system 500. The ACR system 500 accepts input stream 502, which is an original input stream (e.g., compressed and encoded audio and video frames), recognizes the content (504) using a suitable content recognition scheme, optionally replaces certain content with another content that represents a targeted advertisement, and produces an output stream 506 that is a modified version of the input stream 502.

Figure 6:
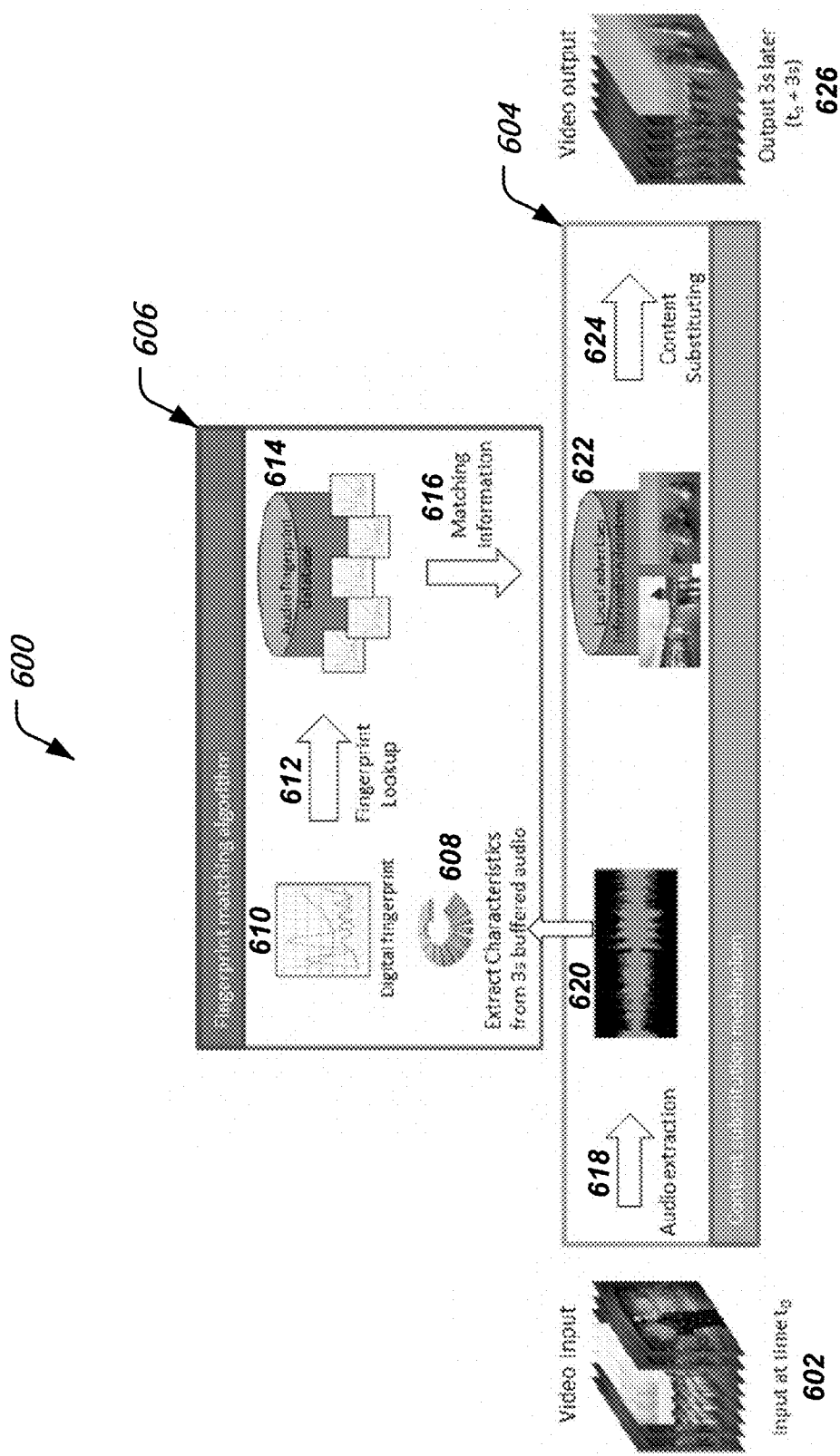
FIG. 6 depicts flow of another embodiment of automatic content recognition.

FIG. 6 depicts an example of architecture of an ACR system 600. An audio/video input sequence 602 is provided at time t0 to a targeted advertisement generation system 604. In operation 618, audio is extracted, analyzed (620) over a certain time duration (e.g., a 3 second buffer), and characteristics of the audio are extracted (608). A digital fingerprinting match is performed (610), e.g., by performing a fingerprint lookup 612 from an audio fingerprinting database 614 to produce matching information 616. The matching information 616 is provided as input to a local advertiser information database 622 to perform content substitution 624 to produce out video 626, e.g., 3 seconds later.

Figure 7:
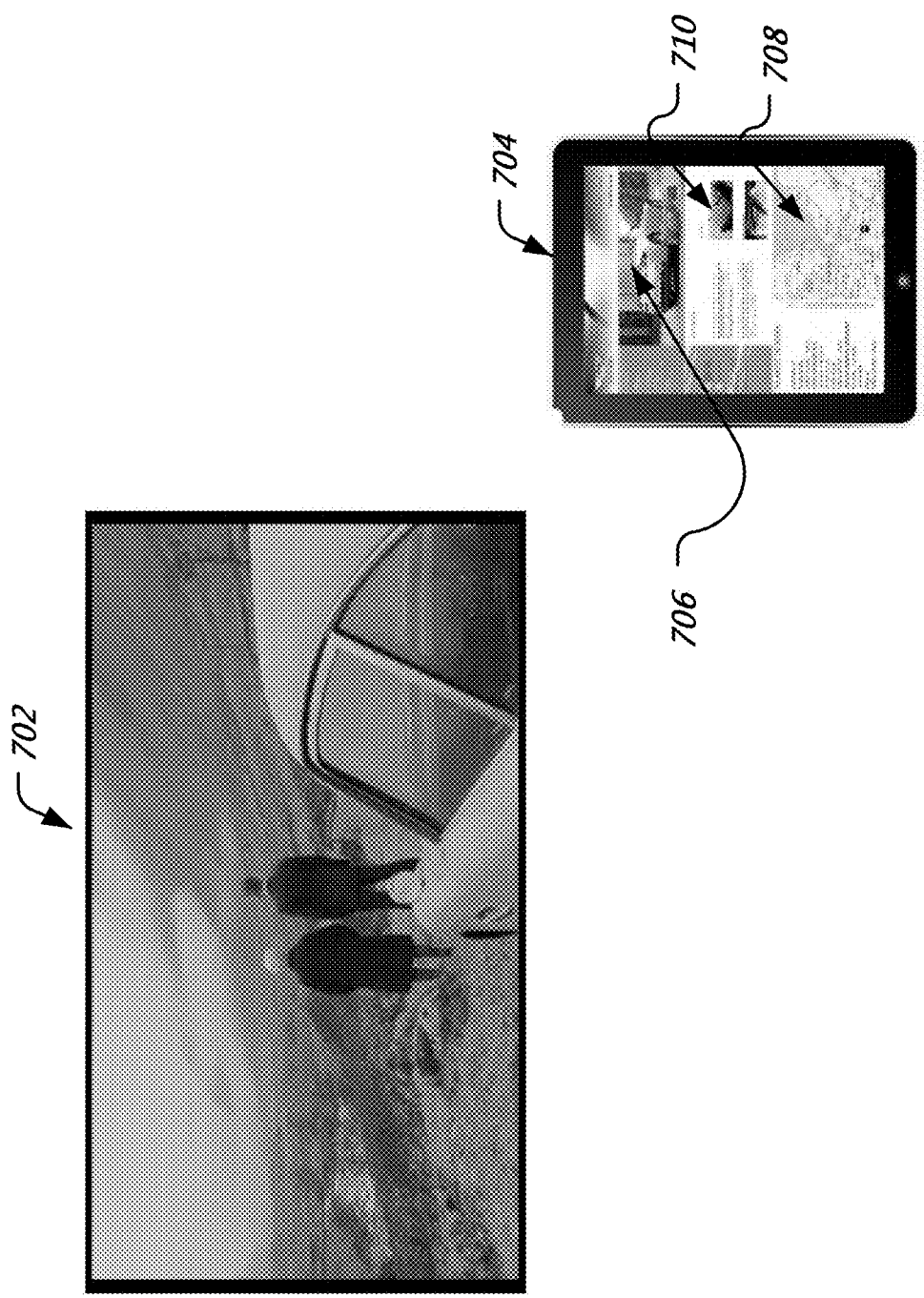
FIG. 7 depicts an example of a primary content and a secondary content.

FIG. 7 is a screen shot of a secondary advertisement content presented to a user. The primary content 702 may, for example, include certain objects—e.g., an automobile, and is displayed on a primary device, such as a television. The corresponding secondary or targeted advertisement content may be purposed for display on a tablet computer or other secondary device (e.g., a mobile phone) 704 and may include secondary advertisement content such as an interactive video clip 706, a coupon or ad banner 710 and a location on map for a seller of the corresponding service or product (in this case, an automobile). In some embodiments, both the primary content 702 and the secondary content may be displayed on the user's secondary connected device.

Figure 8:
FIG. 8 is a screen shot of a secondary advertisement content presented to a user.

FIG. 8 is a screen shot of an example of a secondary advertisement content presented to a user. The primary content 800 may be similar to content 702. The corresponding secondary advertisement content includes an ad banner 804 (e.g., product logo) and an interactive application menu 802 (e.g., "press here for additional information"). The example depicted in FIG. 8 may therefore represent a secondary user device display based on the profile of the user associated with the secondary user device.

Figure 9:
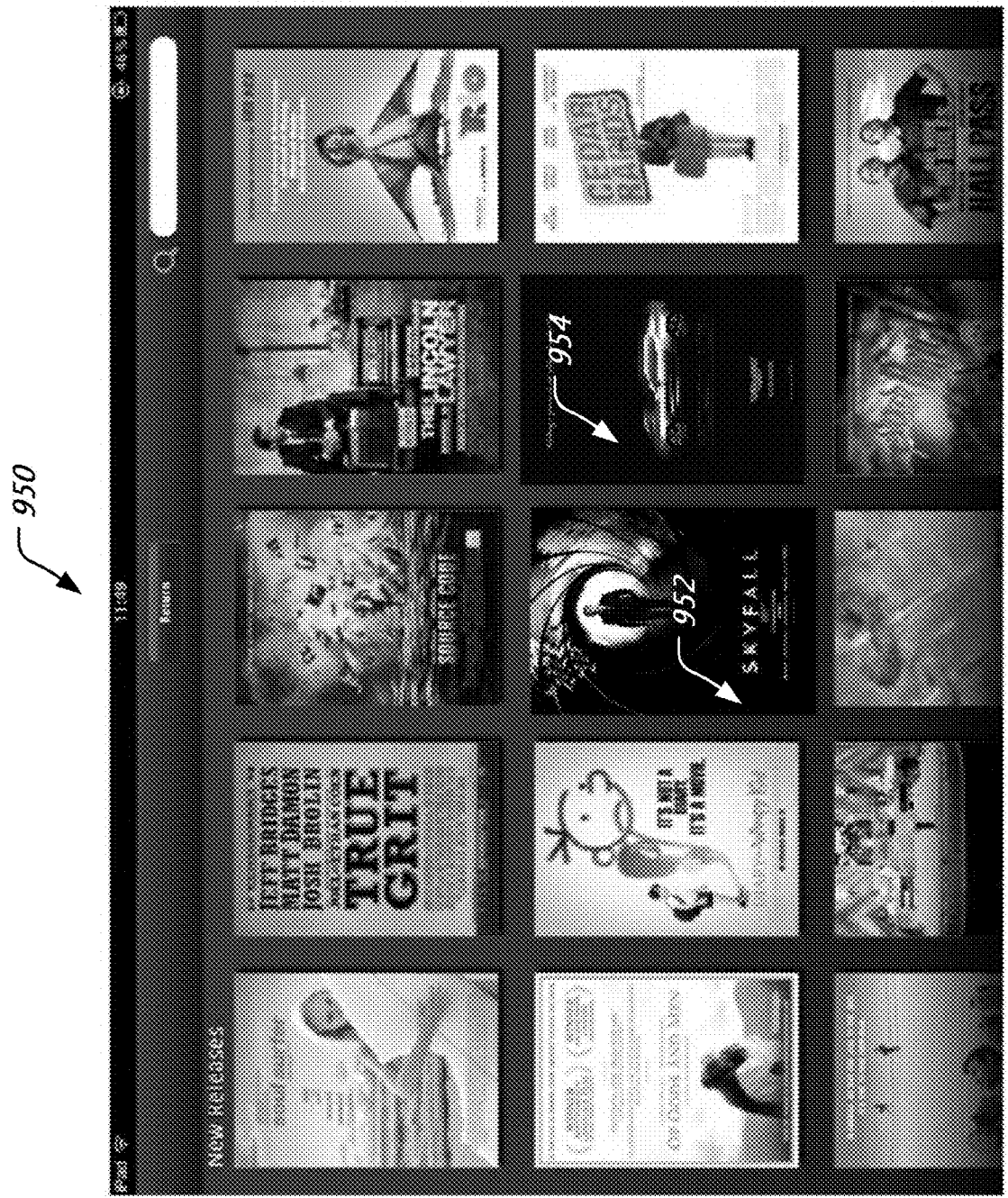
FIG. 9 is a screen shot of a secondary advertisement content presented to a user.

FIG. 9 is a screen shot 950 depicting a way in which secondary advertisement content is displayed on a user device. Based on the recognized content, a program guide viewing by the user (either concurrently or at a later time) is modified to include products similar to the products in which the user has shown interest (e.g., another movie by the same actor 952), or additional products and services that match the user's profile and are related to the primary content (e.g., a video clip 954 that provides additional information about one of the objects that was recognized in the primary content). The example depicted in FIG. 9 may therefore represent a secondary user device display based on the profile of the user associated with the secondary user device.

Figure 10:
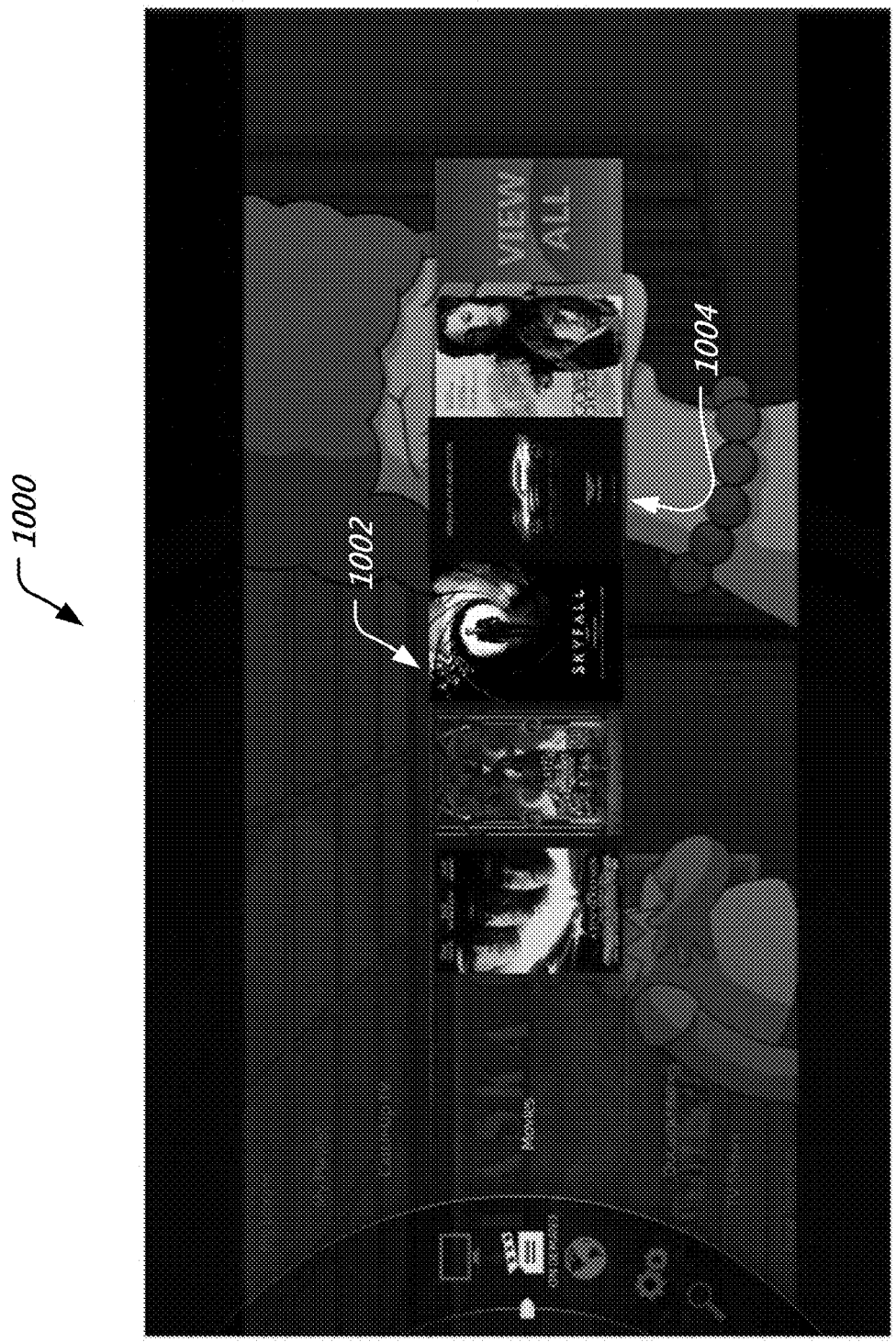
FIG. 10 is a screen shot showing an example of a modified program menu.

FIG. 10 is a screen shot 1000 showing another example of a program guide menu that can be identified to include additional content matching the primary content 1002 or additional content matching a user's profile 1004. The example depicted in FIG. 10 may therefore represent a secondary user device display based on the profile of the user associated with the secondary user device.

Figure 11:
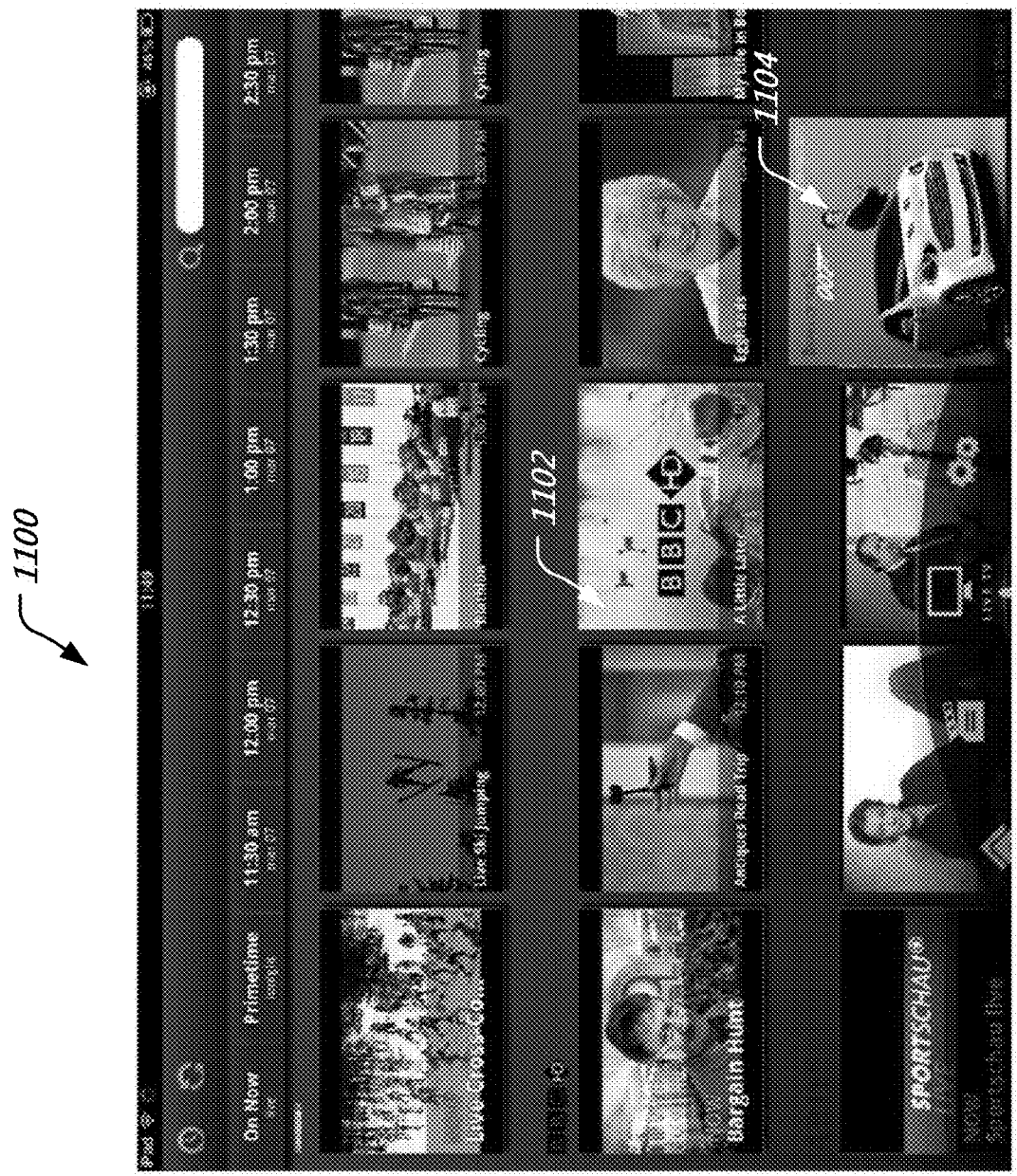
FIG. 11 is a screen shot of a secondary advertisement content presented to a user.

FIG. 11 is a screen shot 1100 of showing another example of providing secondary advertisement content. For example, based on the identified primary content and user profile, a program guide for the user may be modified to show future programming 1102 that the user may find interesting or other content of interest to the user (e.g., a program title 1104 that has a similar content as the current primary content). The example depicted in FIG. 11 may therefore represent a secondary user device display based on the profile of the user associated with the secondary user device.

Figure 12:
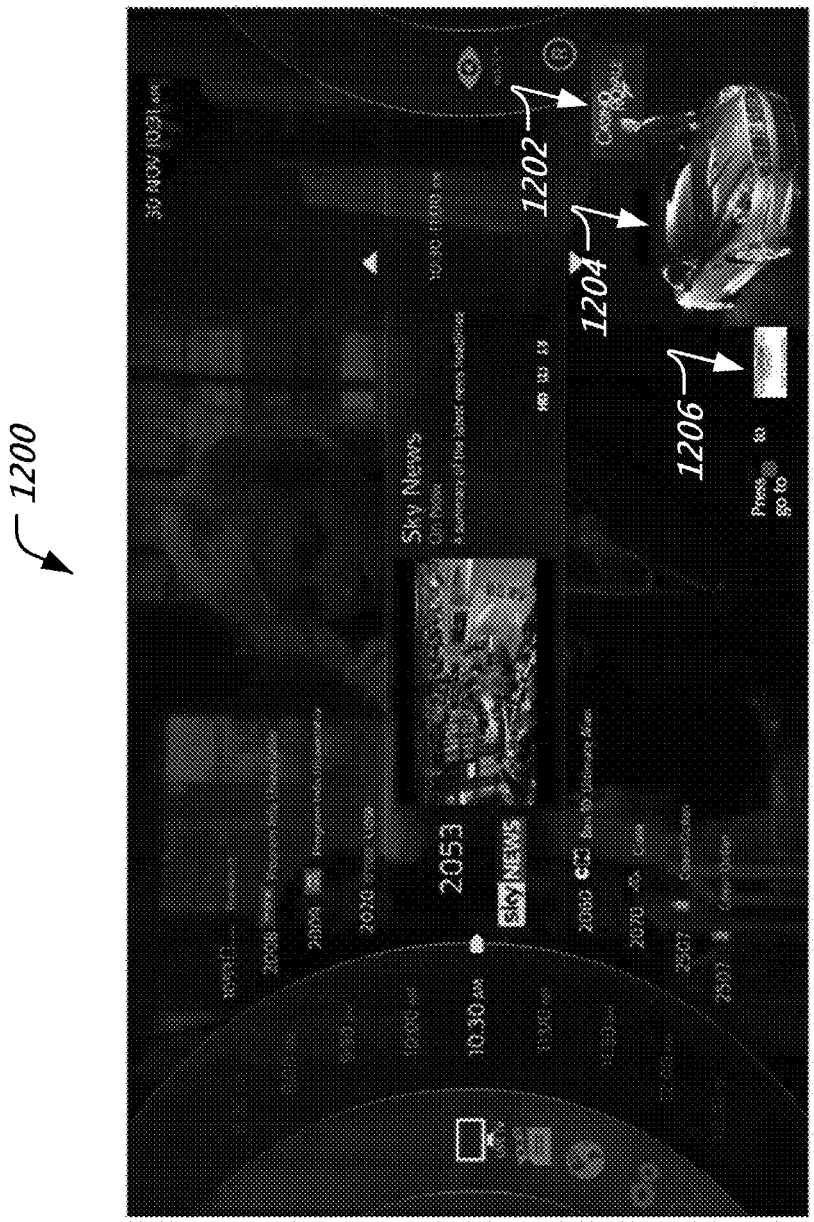
FIG. 12 is a screen shot of an example of presenting secondary advertisement content to a user.

FIG. 12 is a screen shot 1200 of another example of presenting secondary advertisement content to a user. The secondary advertisement content in this example includes a menu for a related content 1202 (e.g., a similar movie that the user may like), a menu item for the object that the ACR recognized as being in the primary content 1204 (a specific automobile brand) or an interactive menu for additional information 1206. The example depicted in FIG. 12 may therefore represent a secondary user device display based on the profile of the user associated with the secondary user device.

Figure 13:
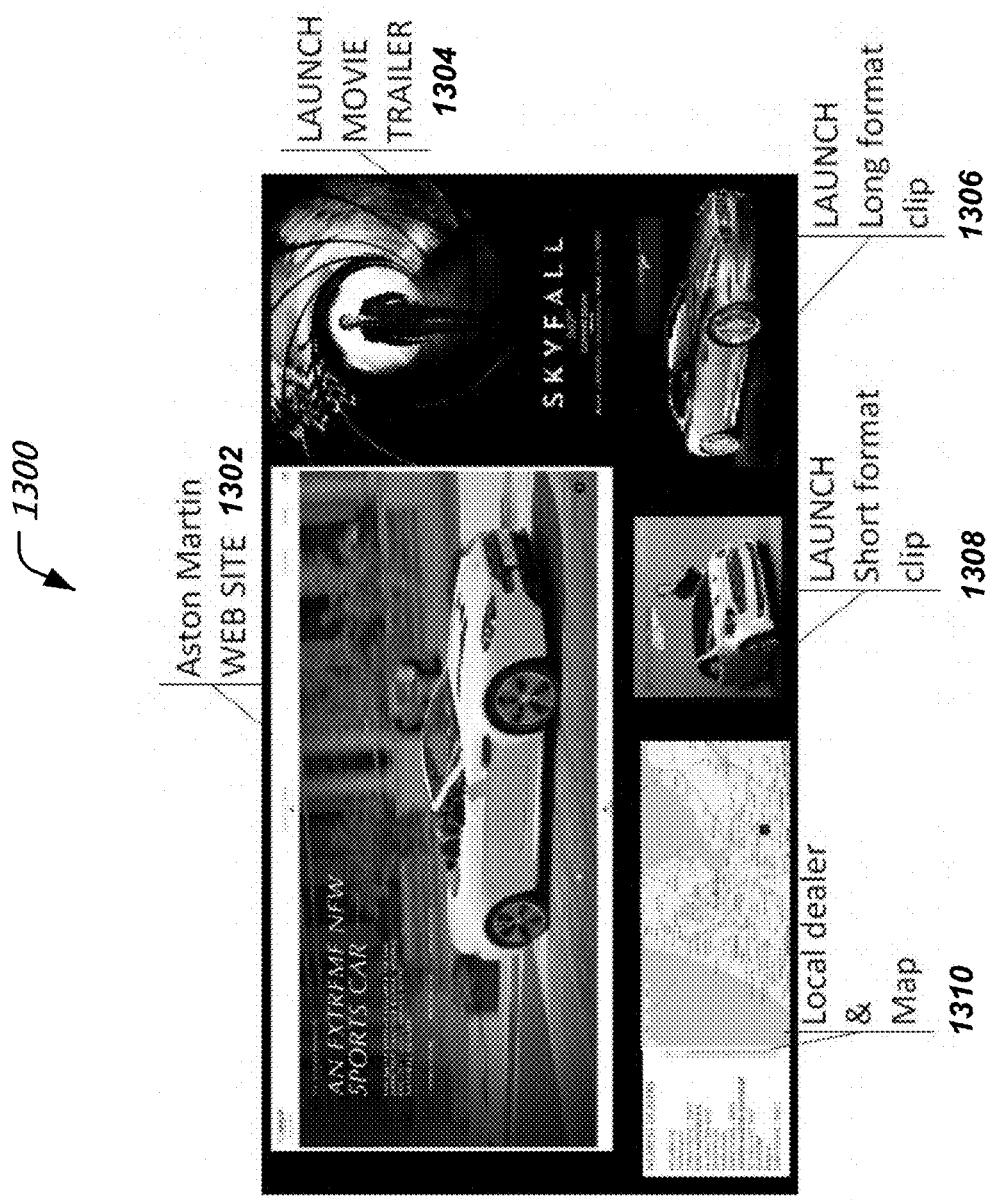
FIG. 13 depicts some alternative targeted advertisements for a same primary content.

FIG. 13 depicts some alternative targeted advertisements for a same primary content 1300. The example targeted advertisements include—a link to a relevant web site 1302, a menu option for launching a movie preview 1304, a link to a long format clip for a product identified to be in the primary content 1306, a short format or alternate clip 1308 and other related information such as a vendor information and map location where the vendor is 1310. The example depicted in FIG. 13 may therefore represent a secondary user device display based on the profile of the user associated with the secondary user device.

Figure 14:
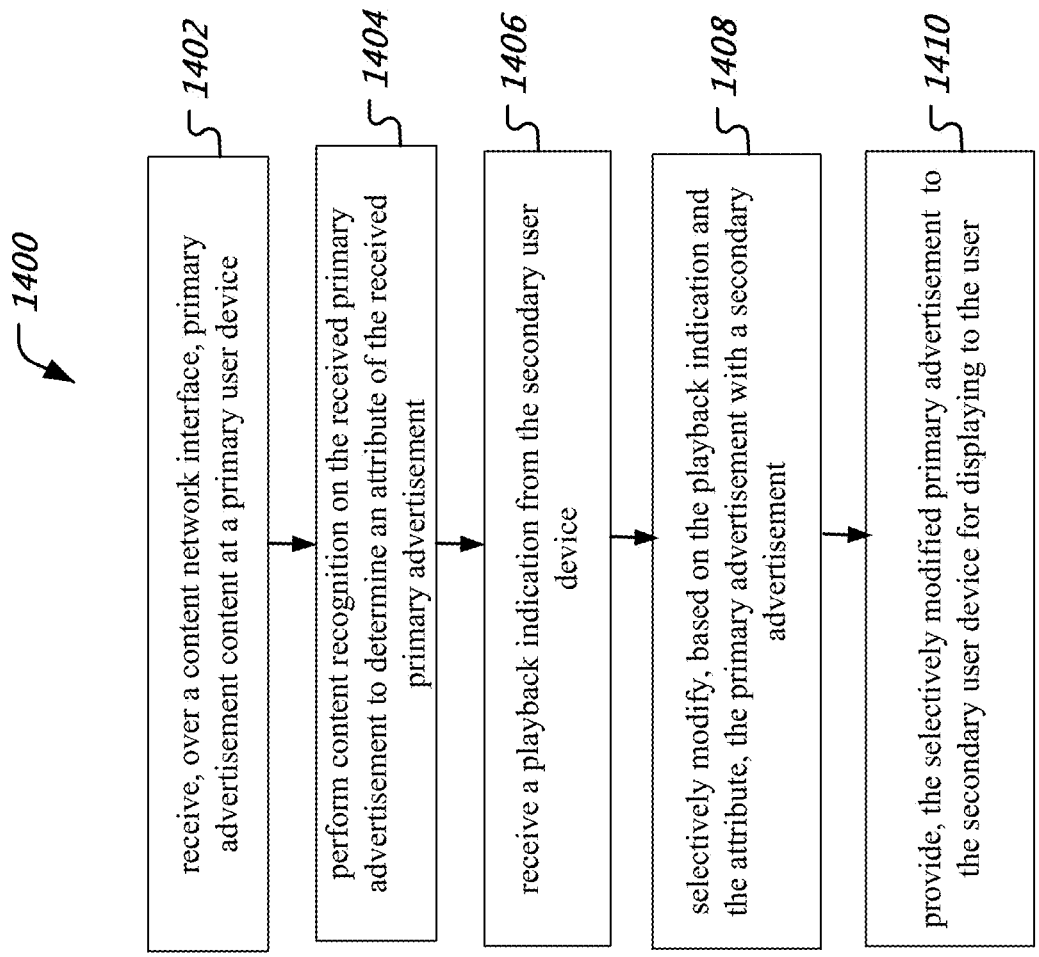
FIG. 14 is a flowchart representation of a process of pushing targeted advertisements to a user.

FIG. 14 is a flowchart representation of a process 1400 of pushing targeted advertisements to a user. At 1402, primary content is received over a content network interface. As previously discussed, the content may be received as a live transmission over a wired interface such as cable or optical fiber or over a wireless interface such as satellite or a cellular broadband interface.

At 1404, content recognition is performed on the received primary content to determine an attribute of the received primary content. In some embodiments, the content recognition is performed by extracting image patterns from the primary content (e.g., automobile advertisement may include an image pattern that of an automobile) and matching the extracted image patterns with a library of reference image patterns, which may be stored locally or at an external server.

At 1406, a playback indication is received from a secondary user device such as the above-described tablet, touchpad or phone device. The playback indication may, e.g., be based on a user's interaction with a control at the secondary user device. Alternatively or additionally, the playback indication may be automated, i.e., without explicit user interaction, to simply let the primary user device become aware of a temporal location of playback on the secondary user device.

At 1408, based on the playback indication and the attribute, the primary content is selectively modified with a secondary advertisement. As previously described, in some implementations, the modification includes overlaying an advertisement banner over the primary content as a banner.

In some embodiments, e.g., as discussed with respect to FIGS. 10 to 13, the modification may also be performed on the guide menu that a user can pull up on his secondary user device.

At 1410, the selectively modified primary content is provided to the secondary user device for displaying to the user. In some implementations, when the user does not have any profile attribute that matches a look-up table, the primary content may be sent to the user in its entirety (i.e., without any modification). In some implementations, the selective modification may include retrieving the secondary advertisement, which may be an ad banner, an interactive application, a game, etc., from a local cache (e.g., hard drive). In some implementations, the selective modification may retrieve a content segment (e.g., an add banner or a video clip) from a local storage and transcode the content segment into a format that is suitable to the secondary user device. For example, display characteristics such as resolution, decoding capability (H.264 or VP8 or another coded), etc. are taken into account. In some implementations, as previously discussed, content is fetched from a remote advertisement server (or servers).

As previously discussed, the user's profile may be associated with the secondary user device from which the content playback request is requested and thus the secondary advertisement is selected based on the user's profile. In some implementations, attributes of the primary content may be used to select the secondary advertisement.

Figure 15:
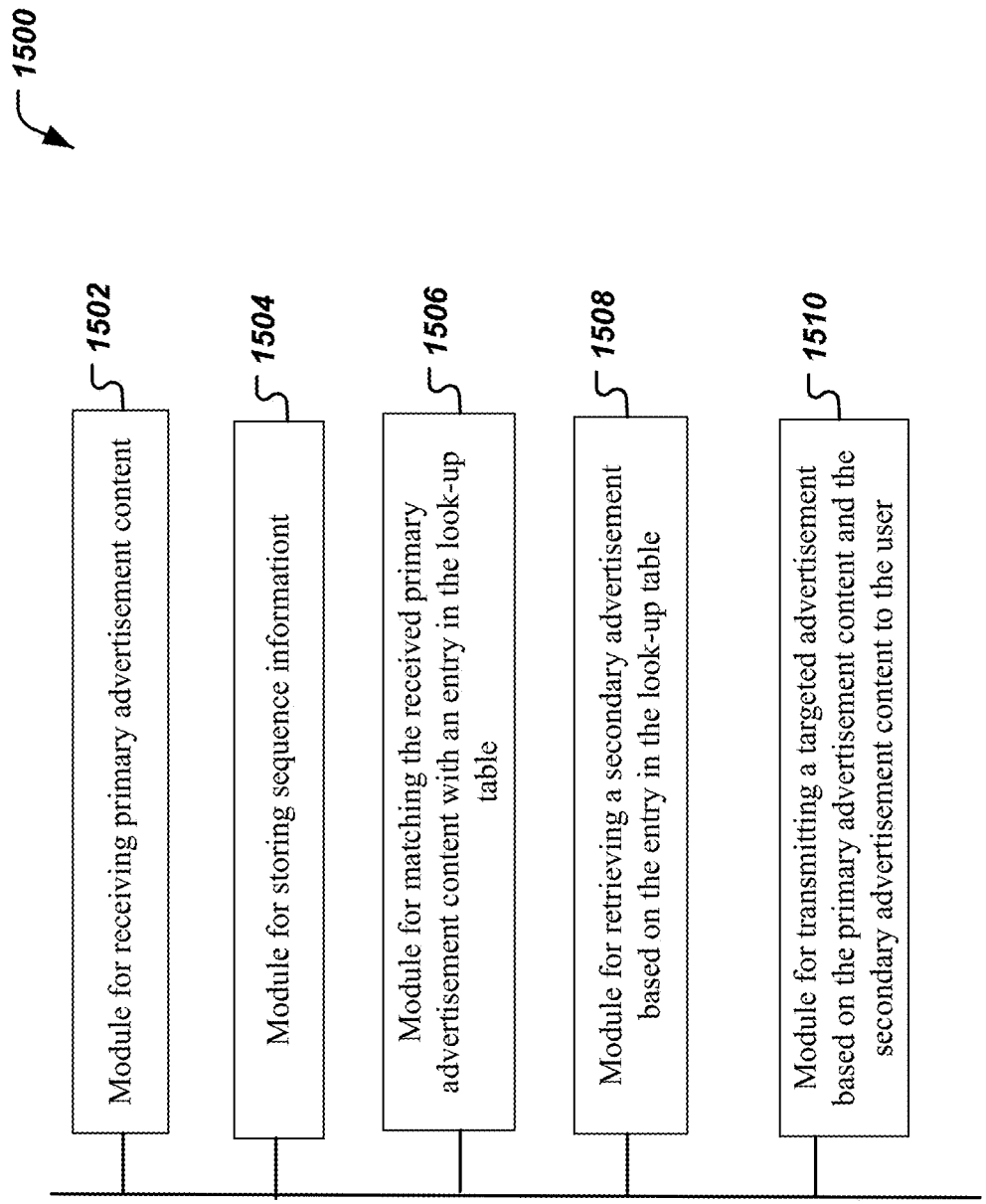
FIG. 15 is a block diagram representation of a portion of a user device.

FIG. 15 is a block diagram representation of a portion of a user device 1500. The module 1502 is for receiving primary content. The module 1504 is for storing sequence information. The module 1506 is for matching the received primary content with an entry in the look-up table. The module 1508 is for retrieve a secondary advertisement based on the entry in the look-up table. The module 1510 is for transmitting a targeted advertisement based on the primary content and the secondary advertisement content to the user. In some implementations, e.g., the secondary advertisement content may be transcoded prior to transmitting to the user.

Figure 16:
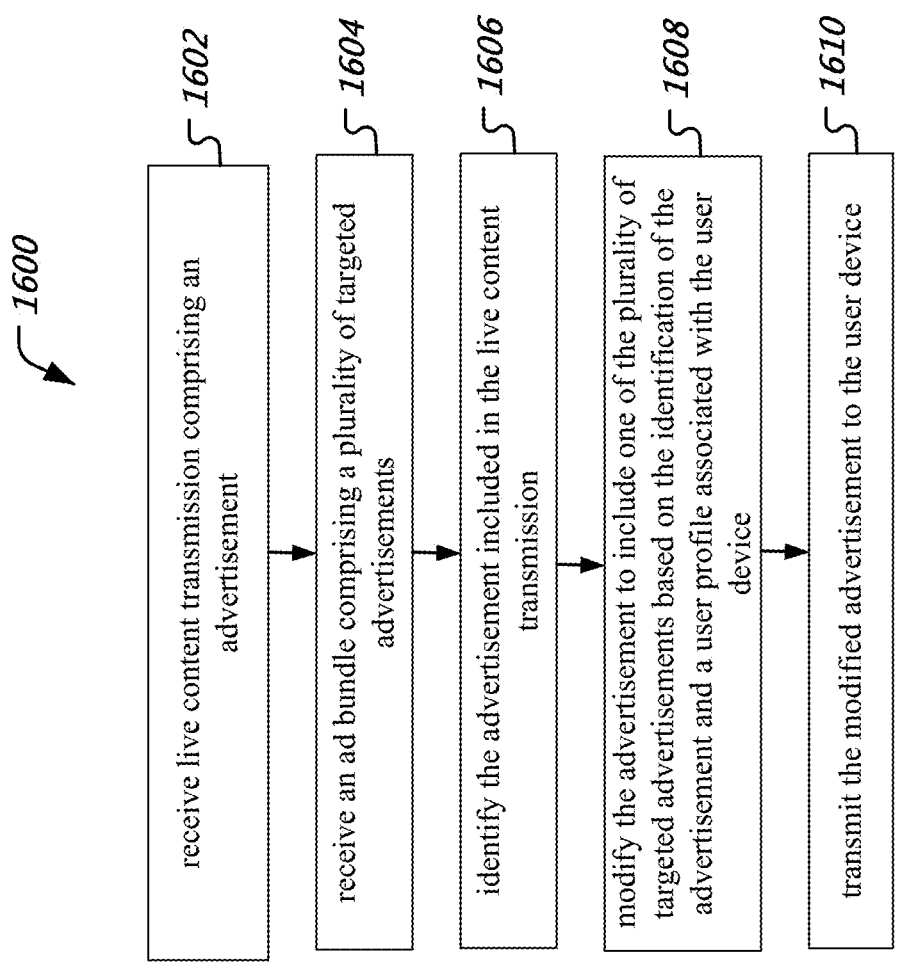
FIG. 16 is a flowchart representation of another process of pushing targeted advertisements to a user.

FIG. 16 is a flowchart representation of another process 1600 of pushing targeted advertisements to a user.

At 1602, live content transmission comprising an advertisement is received at a set-top box. The live content transmission may be received from a cable, a satellite or another suitable content delivery network.

At 1604, an ad bundle comprising a plurality of targeted advertisements is received by the set-top box. The ad bundle may be received on the content network connection or alternatively may be received on a data network connection (e.g., a cable modem connection) and may include metadata information that synchronizes the ad bundle with corresponding primary content.

At 1606, an advertisement included in the live content transmission is identified. In some implementations, the identification is performed based on the previously discussed ACR technology.

At 1608, the received advertisement is modified to include one of the plurality of targeted advertisements based on the identification of the advertisement and a user profile associated with the user device. The user profile may be based on a pre-registered user profile, as previously described.

At 1610 the modified advertisement is transmitted to the user device (e.g., a tablet, touchpad or a smartphone). The modified advertisement may have been modified, e.g., to fit the display size or the software platform of the secondary user device (e.g., convert from Flash to ".mov" format when the user device is an Apple device).

Figure 17:
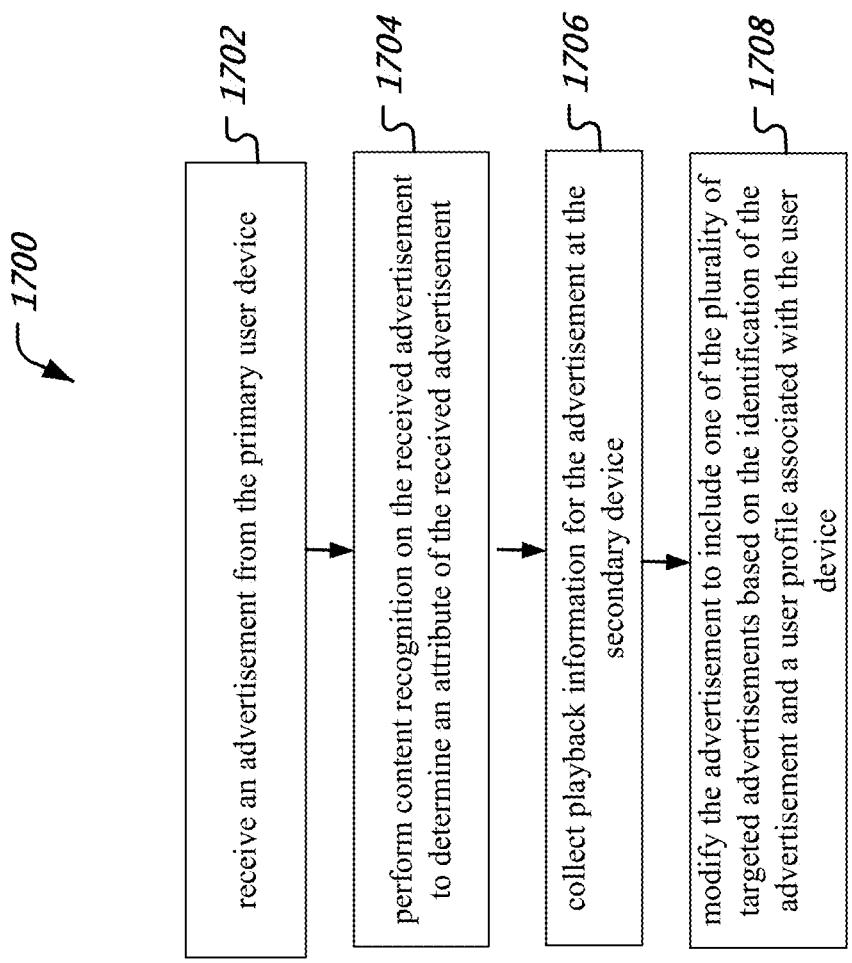
FIG. 17 is a flowchart representation of a process of providing advertisement playback information from a secondary user device to a primary user device.

FIG. 17 is a flowchart representation of a process 1700 of providing advertisement playback information from a secondary user device to a primary user device.

At 1702, an advertisement is received from a primary user device. As described above, the advertisement may be a targeted advertisement send to the secondary user device.

At 1704, content recognition is performed on the received advertisement to determine an attribute of the received advertisement. Various content recognition techniques, e.g., the previously discussed ACR technology could be used in performing content recognition.

At 1706, playback information is collected for the advertisement at the secondary device. In some implementations, the collected playback information about at least one of a user interaction with the received advertisement and a duration of playback of the received advertisement. The collected playback information may include, e.g., information about user "clicks" (for a pointer based device) or "touches" (for a touchscreen device), the frequency of the user interaction, whether or not the user clicked on a hyperlink embedded in the advertisement to explore additional information about the advertisement, and so on.

At 1708, at least one of the attribute of the received advertisement and the playback information is provided back to the primary user device. The attribute of the received advertisement may identify, e.g., the advertisement included a second video content or a second audio content or an overlaid banner or an interactive application (e.g., examples discussed with respect to FIGS. 7 to 13).

In some implementations, the collected playback information may also be used to update the user's profile. For example, a user who never watched sports may interact extensively with a sports based commercial. In such a case, the user profile, that initially indicated that the user is not interested in sports, may be updated to indicate that the user as some interest in sports (e.g., change from level 0 to level 1 on a scale of 0 to 10).

Figure 18:
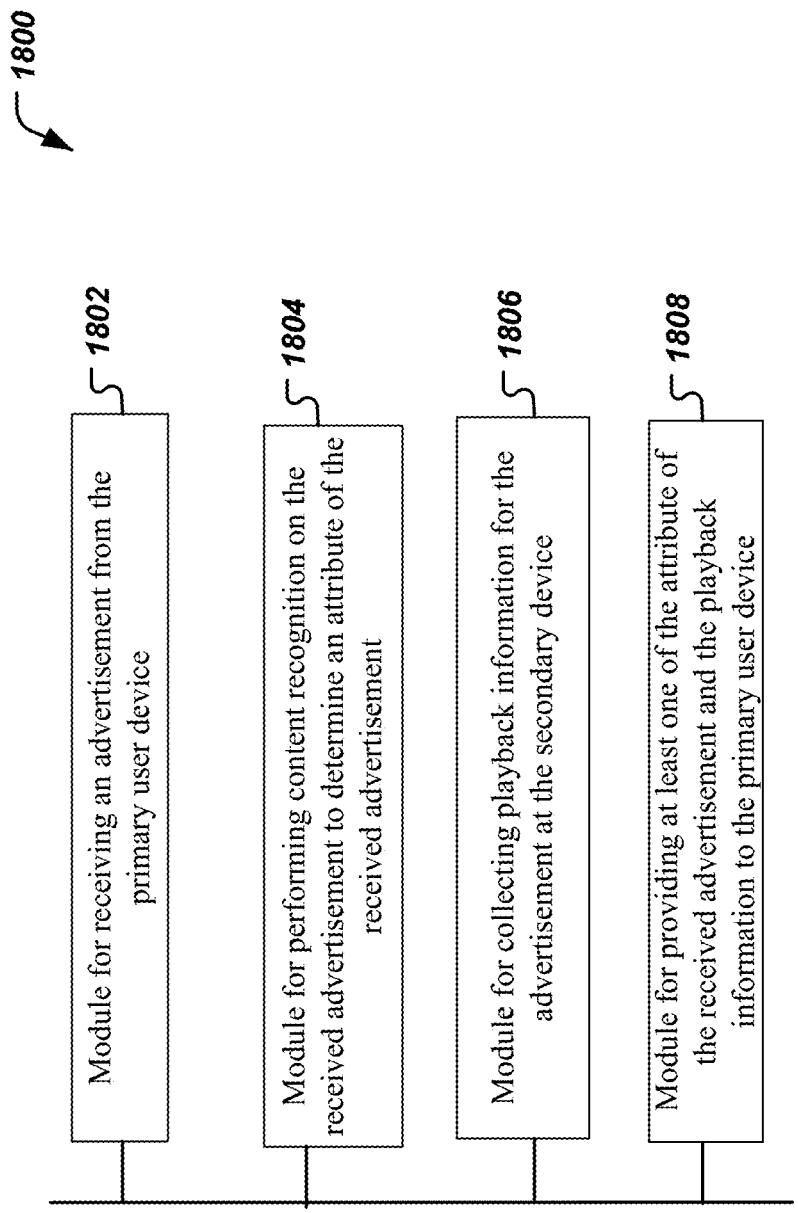
FIG. 18 is a block diagram representation of an apparatus that provides advertisement playback information from a secondary user device to a primary user device.

FIG. 18 is a block diagram representation of an apparatus 1800 providing advertisement playback information to a primary user device. The module 1802 is for receiving an advertisement from the primary user device. The module 1804 is for performing content recognition on the received advertisement to determine an attribute of the received advertisement. The module 1806 is for collecting playback information for the advertisement at the secondary device. The module 1808 is for providing at least one of the attribute of the received advertisement and the playback information to the primary user device. The apparatus 1800 may store information about user interaction such as whether the user muted volume during advertisement playback and whether the user navigated to a resource location displayed with the advertisement. As previously described with respect to FIGS. 8 to 13, based on the user interaction with the advertisement, subsequent display of a program guide may be modified (e.g., to include related titles).

It will be appreciated that several techniques have been disclosed for pushing targeted advertisement content to a secondary connected user device. In some disclosed embodiments, the secondary advertisement content is selected from an ad bundle that is either received a priori or is fetched from an advertisement server as needed. The secondary advertisement content selection may be based on a user profile associated with the secondary user device and/or sequence identified in the primary content from which the targeted advertisement insertion is triggered.

It will further be appreciated that the disclosed technologies advantageously use automatic content recognition either at the primary user device (e.g., a set-top box) or at the secondary user device (e.g., a tablet, smartphone, second television, etc.). The automatic content recognition technique can be used to provide target advertisement and also to provide feedback to advertisers about success of their advertisement campaign.

The disclosed and other embodiments, modules and the functional operations described in this document (e.g., a content network interface, a look-up table, a fingerprint processor, a bundle manager, a profile manager, a content recognition module, a display controller, a user interaction module, a feedback module, a playback indication module, a program guide module, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. An apparatus for providing targeted content, comprising:
   memory storing executable instructions;
   a network interface; and
   a processor connected to the network interface and controlled by the executable instructions that when executed by the processor further cause the processor to:
   receive media content by the network interface, the media content corresponding to a first time interval and including at least first targeted content and second targeted content;
   perform content recognition on the media content to recognize a video sequence in the media content, the content recognition using a video stream in the media content;
   associate the first targeted content with a first user, based at least on a first user profile and the video sequence;
   associate the second targeted content with a second user, based at least on a second user profile and the video sequence, the first user related to the second user;
   determine that a first user device is associated with the first user;
   determine that a second mobile user device is associated with the second user;
   cause the first user device to render the first targeted content included in the media content and corresponding to the first time interval; and
   cause the second mobile user device to render the second targeted content included in the media content and corresponding to the first time interval.

2. The apparatus according to claim 1, wherein the media content is associated with a geographic region and is received by the network interface based on the apparatus being located in the geographic region.

3. The apparatus according to claim 1, wherein the executable instructions when executed by the processor further cause the processor to:
   verify that the video sequence corresponds to at least the first targeted content and the second targeted content.

4. The apparatus according to claim 1, wherein the first user device includes at least one of a set top box, a content receiver device, or an over-the-top (OTT) receiver.

5. The apparatus according to claim 1, wherein the first targeted content includes at least one of a banner, an application or a game.

6. The apparatus according to claim 1, wherein the executable instructions when executed by the processor further cause the processor to:
   extract image patterns from the media content; and
   match the extracted image patterns with a library of reference image patterns.

7. The apparatus according to claim 1, wherein the first user device and the second mobile user device are associated with a household.

8. The apparatus according to claim 1, wherein the first user device includes at least one of a mobile phone or a tablet device.

9. The apparatus according to claim 1, wherein the executable instructions when executed by the processor further cause the processor to:
   cause the second mobile user device to render the second targeted content based on a second user preference associated with the second user profile.

10. The apparatus according to claim 1, wherein the first user profile includes demographic information.

11. A method for providing targeted content, the method comprising:
    receiving media content corresponding to a first time interval and including at least first targeted content and second targeted content;
    performing content recognition on the media content to recognize a video sequence in the media content, the content recognition using a video stream in the media content;
    associating the first targeted content with a first user, based at least on a first user profile and the video sequence;
    associating the second targeted content with a second user, based at least on a second user profile and the video sequence, the first user related to the second user;
    determining that a first user device is associated with the first user;
    determining that a second mobile user device is associated with the second user;

causing the first user device to render the first targeted content included in the media content and corresponding to the first time interval; and causing the second mobile user device to render the second targeted content included in the media content and corresponding to the first time interval.

12. The method according to claim 11, wherein the media content is associated with a geographic region and is received by an apparatus based on the apparatus being located in the geographic region.

13. The method according to claim 11, further comprising:

verifying that the video sequence corresponds to at least the first targeted content and the second targeted content.

14. The method according to claim 11, wherein the first user device includes at least one of a set top box, a content receiver device, or an over-the-top (OTT) receiver.

15. The method according to claim 11, wherein the first targeted content includes at least one of a banner, an application or a game.

16. The method according to claim 11, further comprising:

extracting image patterns from the media content; and matching the extracted image patterns with a library of reference image patterns.

17. The method according to claim 11, wherein the first user device and the second mobile user device are associated with a household.

18. The method according to claim 11, wherein the first user device includes at least one of a mobile phone or a tablet device.

19. The method according to claim 11, further comprising:

causing the second mobile user device to render the second targeted content based on a second user preference associated with the second user profile.

20. The method according to claim 11, wherein the first user profile includes demographic information.

* * * * *